United States Patent [19] [11] 4,342,049
Dickinson [45] Jul. 27, 1982

[54] SUPPORTIVE MEANS FOR A CATHODE RAY TUBE

[75] Inventor: William A. Dickinson, Ottawa, Ohio

[73] Assignee: North American Philips Consumer Electronics Corp., New York, N.Y.

[21] Appl. No.: 147,903

[22] Filed: May 8, 1980

[51] Int. Cl.³ .......................................... H04N 5/645
[52] U.S. Cl. .................................... 358/246; 358/248
[58] Field of Search ............... 358/245, 246, 247, 248; 220/2.1 A, 2.3 A

[56] References Cited

U.S. PATENT DOCUMENTS

| | | | |
|---|---|---|---|
| 2,851,679 | 9/1958 | Wayne | 358/248 |
| 3,777,057 | 12/1973 | Abe | 358/246 |
| 4,080,631 | 3/1978 | Puhak | 358/246 |
| 4,155,102 | 5/1979 | Bongenaar | 358/246 |
| 4,210,935 | 7/1980 | Mitchell et al. | 358/246 |

FOREIGN PATENT DOCUMENTS 55-1009  1/1980  Japan ............... 220/2.1 A

Primary Examiner—Joseph A. Orsino, Jr.
Attorney, Agent, or Firm—Thomas A. Briody; Jack Oisher; John C. Fox

[57] ABSTRACT

The invention relates to an improvement in a type of CRT mounting bracket employed in a multiple-bracket system for supporting a banded tube in a display environment. The seating portion of the bracket incorporates a configurative modification in the banding-related surface. This, in turn, imparts a mating adaptation to an area of the banding subsequently tensioned thereover, thereby effecting secure placement of the bracket.

1 Claim, 4 Drawing Figures

U.S. Patent        Jul. 27, 1982        4,342,049
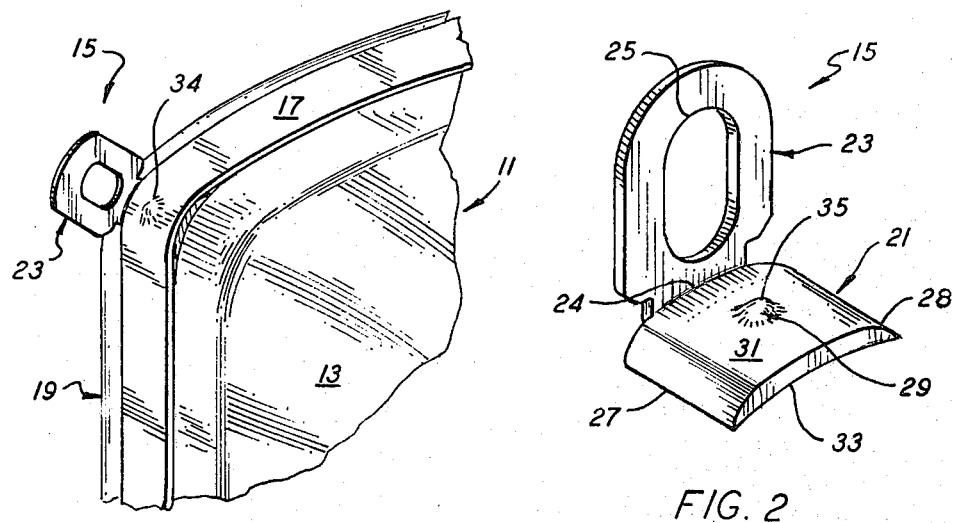
FIG. 1
FIG. 2
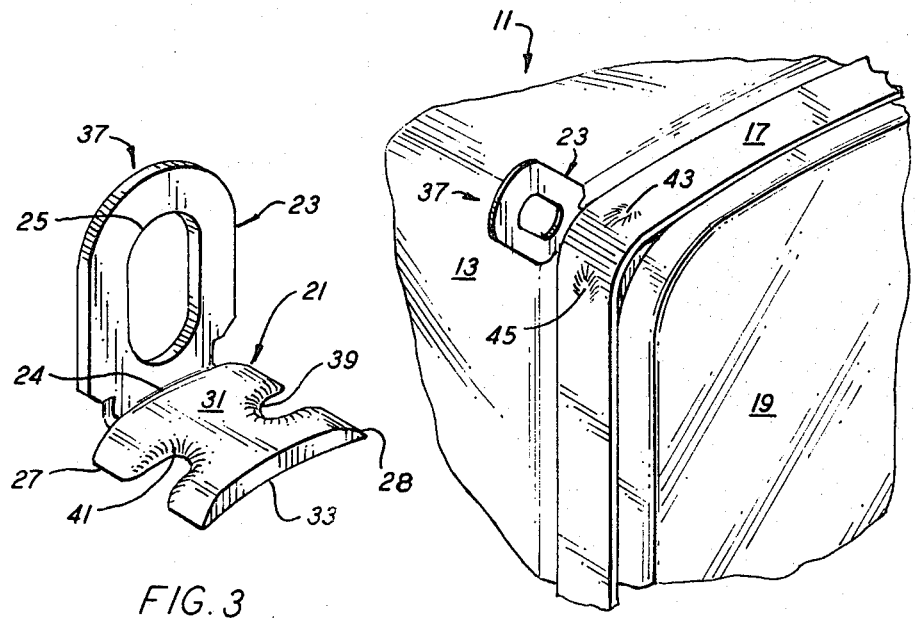
FIG. 3
FIG. 4

SUPPORTIVE MEANS FOR A CATHODE RAY TUBE

TECHNICAL FIELD

This invention relates to cathode ray tubes and more particularly to improved bracket means for supporting an implosion-resistant CRT.

BACKGROUND ART

It is common practice in cathode ray tube art, especially in those tube types utilized in television and associated display applications, to employ implosion resistant means in the form of a tensioned metallic banding; such being oriented in an encompassing manner about the tube envelope in the forward region adjacent to the panel viewing area. Tubes of this construction often employ a plurality of spaced-apart substantially L-shaped supporting brackets having a seating portion and a related integral upstanding appendage. The seating portion is normally held in a sandwiched manner between the surface of the tube envelope and the superjacent banding tightly tensioned thereover to provide the intended implosion-inhibiting characteristics. The integral upstanding appendage has an aperture therethrough suitable for accommodating bolt type means to effect supportive positioning of the tube in a utilization environment. Even though the seating portion exhibits smooth upper and lower surfaces, which permit the banding to seat tightly thereover, there have been aggravating instances when a bracket seating portion shifts or slips in its sandwich positioning. Such shifting of any one of the brackets from its intended location produces misalignment with the conjunctive tube supportive positioning means, weakens the bracket-to-tube relationship and enervates the implosion-inhibiting characteristics of the system. Thus, slip-page of any bracket from its intended location becomes a deleterious factor contributing to degradation of the desired quality of the finished tube product.

DISCLOSURE OF THE INVENTION

The present invention is addressed to an improvement in the spaced apart mounting bracket means for supporting a cathode ray tube employing implosion-inhibiting banding means. The improvement relates to modification of the seating portion by incorporating discrete configurative means therein in the area between the side-related regions of the portion subsequently covered by the banding. The configurative means constitute a defined change in the band-adhering surface of the seating portion. This surface change imparts a mating-shaping adaptation to a section of the subsequently applied overlying banding thereby insuring secure positional affixation of the bracket when the metallic banding is tensioned thereover.

BRIEF DESCRIPTION OF THE DRAWINGS

FIG. 1 is a partial perspective of the forward portion of a cathode ray tube illustrating placement of the improved bracket as finally positioned and securely affixed beneath the banding encompassing the tube;

FIG. 2 is a perspective of the improved bracket illustrating an embodiment of the invention incorporated therein;

FIG. 3 is a perspective of the improved bracket showing another embodiment of the invention; and FIG. 4 is a partial perspective view of the forward portion of a cathode ray tube, taken from an angle differing from that of FIG. 1, and illustrating placement of the embodiment delineated in FIG. 3.

BEST MODE FOR CARRYING OUT THE INVENTION

For a better understanding of the present invention together with the advantages and capabilities thereof, reference is made to the following specification and appended claims in connection with the aforedescribed drawings.

While the invention is illustrated as being formed for utilization with a cathode ray tube of substantially rectangular shaping, the teachings of the disclosure are intended to be equally applicable to usage with other tube envelope forms, such as round or ovate shapings.

With reference to the drawings, there is shown in FIG. 1, a partial perspective of the forward portion of a cathode ray tube 11, as viewed from the funnel region 13. One of the spaced-apart plurality of improved mounting brackets 15, for supporting the tube in a display orientation, is shown positioned in conjunction with a tensioned implosion-inhibiting banding 17. This banding is peripherally located as a tensioned encompassment of the forward region of the tube 11 about a side-related region adjacent the viewing area 19 thereof.

The improved mounting bracket 15, as shown in FIG. 2, is formed a rigid material such as metal or plastic. It is shaped as a substantially L-shaped structure having a substantially arcuately formed seating portion 21, and an integral ear-like appendage 23 upstanding from an edge 24 of the seating portion which is substantially parallel with the subsequent banding orientation. This appendage contains an aperture 25 to accommodate means for facilitating subsequent attachment of the mounting bracket 15 to a display placement means, not shown. As illustrated in the drawings, the substantially arcuate formation of the bracket seating portion 21 is compatibly fashioned so that the lower surface thereof conforms to a discrete perimetrical surface region of the tube to facilitate sandwich-like placement between the banding 17 and the selected peripheral area of the tube.

Further consideration of the bracket seating portion delineates inclined or sloped side-related regions 27 and 28 which are transverse to the orientation of the banding 17. The invention is directed to a modification of the seating portion 21 in the area between the aforementioned side-related regions. Such modification is in the form of configurative surface-changing means incorporated into the seating portion proper. The configurative embodiment illustrated in FIGS. 1 and 2 is in the form of at least one bump or protrusion means 29 formed to jut outward from the upper surface 31 of the seating portion, such being oriented intermediate the side-related regions 27 and 28. While this protrusion can be achieved by bonding and shaping added material to the top surface of the seating portion, it is most expeditiously attained as the resultant of an opposed dimple-like indent formed inward from the lower surface 33 of the seating portion. Subsequently applying and tensioning the banding 17 thereover, imparts a raised mating-shaping adaptation 34 to a section of the overlying banding, as shown in FIG. 1, thereby insuring secure positional affixation of the bracket. While not shown, like results are achieved for the other remaining brackets comprising the mounting system. It is important that the protrusion 29 evidences a smooth surface and a substantially rounded apex 35, and be free of abrasive projections to prevent any impediment of uniform banding movement during tensioning.

Another embodiment of the invention is shown in FIGS. 4 and 5, wherein mounting bracket 37 has a number of parts notations similar to those of bracket 15, but wherein there is a differing manifestation of the configurative surface-changing means incorporated in the seating portion 21. In this second embodiment of the invention, the configurated means is comprised of at least one, and preferably two, substantially U-shaped notches or cutouts 39 and 41 formed inward through the inclined areas of each side-related region 27 and 28. These contoured cut-out configurations are oriented in a manner to be in line with and covered by the subsequently applied banding 17. When the banding is tensioned, mating-shaping indent-like adaptations 43 and 45 are imparted, by the discretely shaped seating portion contours, to the overlying areas of the banding thereby securing positional locking of the sandwich-oriented bracket. As with the first embodiment, the surface-related shapings of the second embodiment configurations, i.e., the substantially U-shaped cutouts, evidence defining contours which are rounded and free of abrasive projections to facilitate uniform seating of the banding during tensioning.

The described embodiments of the improved cathode ray tube supportive brackets evidence discretely configurated seating portions which are suitable for placement with appendage 23 located forward of the banding 17, as shown in FIG. 1; or rearward of the banding as in FIG. 4.

While there have been shown and described what are at present considered the preferred embodiments of the invention, it will be obvious to those skilled in the art that various changes and modifications may be made therein without departing from the scope of the invention as defined by the appended claims.

INDUSTRIAL APPLICABILITY

The aforedescribed CRT mounting bracket means, incorporating the seating portion modification of the invention, provides a marked improvement in the multiple-bracket system utilized for supporting a banded tube in a display environment. The positive affixation of each bracket in its proper positional location insures alignment of the bracketed tube with the associated supporting structure. The invention prevents slippage of the brackets relative to the banding and thereby eliminates localized deleterious stressing of the banding. As a result, banding rejects are minimized, overall tube quality improved, and tube manufacturing costs reduced.

I claim:

1. Cathode ray tube support means in the form of an improved mounting bracket such as employed in a multiple spaced-apart bracket system associated with implosion-inhibiting banding means oriented as a tensioned encompassment of the forward region of the tube adjacent the viewing area thereof, said improved bracket being substantially L-shaped and formed of substantially rigid material comprising:

a seating portion having upper and lower surfaces of substantially arcuate shaping to conform to discrete perimetrical surface regions of said tube to facilitate placement between said banding and the selected surface of said tube, said seating portion having inclined side-related regions transverse to the orientation of said banding with substantially U-shaped cutout having contours related to said upper surface which are rounded and free of abrasive projections, said U-shaped cutouts formed inward through the inclined area of each side-related region in a manner to impart a mating-shaping adaptation to a section of the subsequently applied overlying banding, thereby insuring secure positional affixation of said bracket when said banding is tensioned thereover, and an ear-like appendage integrally upstanding from an edge of said seating portion in a manner substantially parallel with said subsequent banding orientation, said appendage having an aperture therethrough to accommodate appropriate means for subsequently effecting supportive positioning of said tube in a display oriented placement.

* * * * *